US011978986B2

United States Patent
Chong et al.

(10) Patent No.: US 11,978,986 B2
(45) Date of Patent: May 7, 2024

(54) POWER SYSTEM

(71) Applicant: GREENPHYTO PTE LTD, Singapore (SG)

(72) Inventors: Suk Shien Chong, Singapore (SG); Chin Peng Poh, Singapore (SG)

(73) Assignee: GREENPHYTO PTE LTD, Singapore (SG)

( * ) Notice: Subject to any disclaimer, the term of this patent is extended or adjusted under 35 U.S.C. 154(b) by 860 days.

(21) Appl. No.: 17/051,801

(22) PCT Filed: May 2, 2018

(86) PCT No.: PCT/SG2018/050215
§ 371 (c)(1),
(2) Date: Oct. 30, 2020

(87) PCT Pub. No.: WO2019/212405
PCT Pub. Date: Nov. 7, 2019

(65) Prior Publication Data
US 2021/0098947 A1   Apr. 1, 2021

(51) Int. Cl.
*H01R 13/703*  (2006.01)
*H02J 50/12*  (2016.01)

(52) U.S. Cl.
CPC .......... *H01R 13/7037* (2013.01); *H02J 50/12* (2016.02)

(58) Field of Classification Search
CPC ............ H01R 13/7037; H01R 13/6205; H01R 13/7038; H02J 50/12; A01G 9/249
USPC ......................................................... 307/125
See application file for complete search history.

(56) References Cited

U.S. PATENT DOCUMENTS

| 8,181,387 B2 | 5/2012 | Loebl et al. |
| 2006/0051981 A1 | 3/2006 | Neidlein et al. |
| 2006/0073723 A1 | 4/2006 | Cowgill et al. |
| 2007/0072442 A1 | 3/2007 | DiFonzo et al. |

(Continued)

FOREIGN PATENT DOCUMENTS

| CN | 101528028 A | 9/2009 |
| CN | 104114804 A | 10/2014 |

(Continued)

OTHER PUBLICATIONS

Supplementary European Search Report and Written Opinion for Application No. EP18917337.

(Continued)

*Primary Examiner* — Richard Tan
(74) *Attorney, Agent, or Firm* — JCIP; Joseph G. Chu; Jeremy I. Maynard

(57) ABSTRACT

The invention relates to an apparatus and an adapter portion, the apparatus is connectable to the adapter portion and is suitable for conveying power. Each of the apparatus and adapter portion comprises an alignment portion/module configurable to facilitate contactless alignment, a contact portion/module which is capable of being coupled upon proper alignment, and a sensor portion/module configurable to impede or allow flow of power. The invention also relates to a power system including an apparatus which is pendulously coupled to a support structure and an adapter portion. The pendulous coupling facilitates alignment compensation during contactless alignment between the apparatus and the adapter portion.

13 Claims, 10 Drawing Sheets

(56) References Cited

U.S. PATENT DOCUMENTS

| | | | |
|---|---|---|---|
| 2009/0250574 A1* | 10/2009 | Fullerton | ........... G09F 7/04 248/206.5 |
| 2010/0031564 A1 | 2/2010 | Loebl et al. | |
| 2012/0071008 A1 | 3/2012 | Sessford | |
| 2014/0302691 A1 | 10/2014 | Janfada et al. | |
| 2015/0091389 A1 | 4/2015 | Byrne et al. | |
| 2015/0118869 A1 | 4/2015 | Brown et al. | |
| 2017/0237206 A1 | 8/2017 | Byrne et al. | |

FOREIGN PATENT DOCUMENTS

| | | |
|---|---|---|
| CN | 204707549 U | 10/2015 |
| JP | 2010506584 A | 3/2010 |
| WO | 2006126126 A1 | 11/2006 |

OTHER PUBLICATIONS

Chinese Office Action dated Jan. 6, 2022 for Chinese Application No. 201880093060.9.
Chinese Search Report for Chinese Application No. 201880093060.9.
International Search Report and Written Opinion of International Search Authority for International Application No. PCT/SG2018/050215.
International Preliminary Report on Patentability for International Application No. PCT/SG2018/050215.
Written Opinion of International Preliminary Examining Authority for International Application No. PCT/SG2018/050215.
Korean Office Action dated Feb. 2, 2023 for Korean Application No. 10-2020-7033877.

* cited by examiner

POWER SYSTEM

FIELD OF INVENTION

The present invention relates to a power system which is suitable for use in a variety of fields.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Electrical connectors, also referred to as power connectors or power adapters, have been utilized to provide electrical power to electrical appliances or devices. Such electrical connectors typically comprise a plug and socket configuration which require proper alignment before any electrical energy/power can flow.

The plugs and sockets of existing power connectors typically need to be aligned as a safety measure to avoid potential hazard such as short circuit or accidental wrong connection which may damage the electrical appliances, or electrical current will not flow. For example, the configuration of the ubiquitous three-pin plug and corresponding socket requires the user to properly align each pin to the relevant socket. Another example would be a universal serial bus (USB) port of a computer, such as a laptop computer which could be utilized as a power connector for charging electrical appliances such as hand-held devices.

As is known, the USB plug is aligned with the USB port in order to obtain a reliable connection and the positive and negative directions needs to be differentiated before inserting the USB plug into the USB port. Such an insertion may easily cause poor connection between the USB plug of the data line and the USB port. Moreover there might be damage to the USB plug and/or USB port due to the influential factors such as the strength, angle or frequency of insertion, etc. When damage occurs, this increases the occurrence of short circuit or the problem of current flow, thus making it difficult to ensure the safety of use. The same issues of alignments are faced by users when inserting a power adaptor.

In the above examples, operation for users can be fussy. Users typically need to manually align the plug and socket. This may be difficult in areas that are dimly lit or for a user who is visually compromised.

Moreover, the constant movement of the plug and port in and out of each other causes wear and tear which contributes to a faster deterioration of the equipment, resulting in increased costs for replacing the equipment.

Therefore, there exists a need for a better solution to ameliorate at least one of the aforementioned problems.

SUMMARY OF THE INVENTION

Throughout the document, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

According to an aspect of the disclosure there is an apparatus suitable for conveying power and suitable for use with an adapter portion, the adapter portion which is connectable to a power supply source and which comprises a contact module through which power from the power supply source is communicable, the apparatus comprising: a casing shaped and dimensioned to carry: an alignment portion configurable to facilitate contactless alignment between the apparatus and the adapter portion; a contact portion which is capable of being coupled to the contact module when alignment between the apparatus and the adapter portion is established, and a sensor portion configurable to one of impede and allow flow of power between the contact portion and the contact module, The apparatus is advantageous because it provides a fast and clean make and break of the electrical circuit and insure a positive high quality contact between the electrical contact members and thereby eliminate a source of wear and tear which can be caused by poor, arcing, contact members. The apparatus, while affording a firm, forceful connection of the electrical contact members will be at the same time readily detachable under a relatively slight opening or separating force.

The invention possesses other objects and features of advantage, some of which, with the foregoing, will be set forth in the following description of the preferred form of the invention which is illustrated in the drawing accompanying and forming part of the specification. It is to be understood, however, that variations in the showing made the said drawing and description may be adopted within the scope of the invention as set forth in the claims.

Other aspects of the invention will become apparent to those of ordinary skilled in the art upon review of the following description of specific embodiments of the invention in conjunction with the accompanying figures.

DESCRIPTION OF EMBODIMENTS OF THE INVENTION

Figure 1:
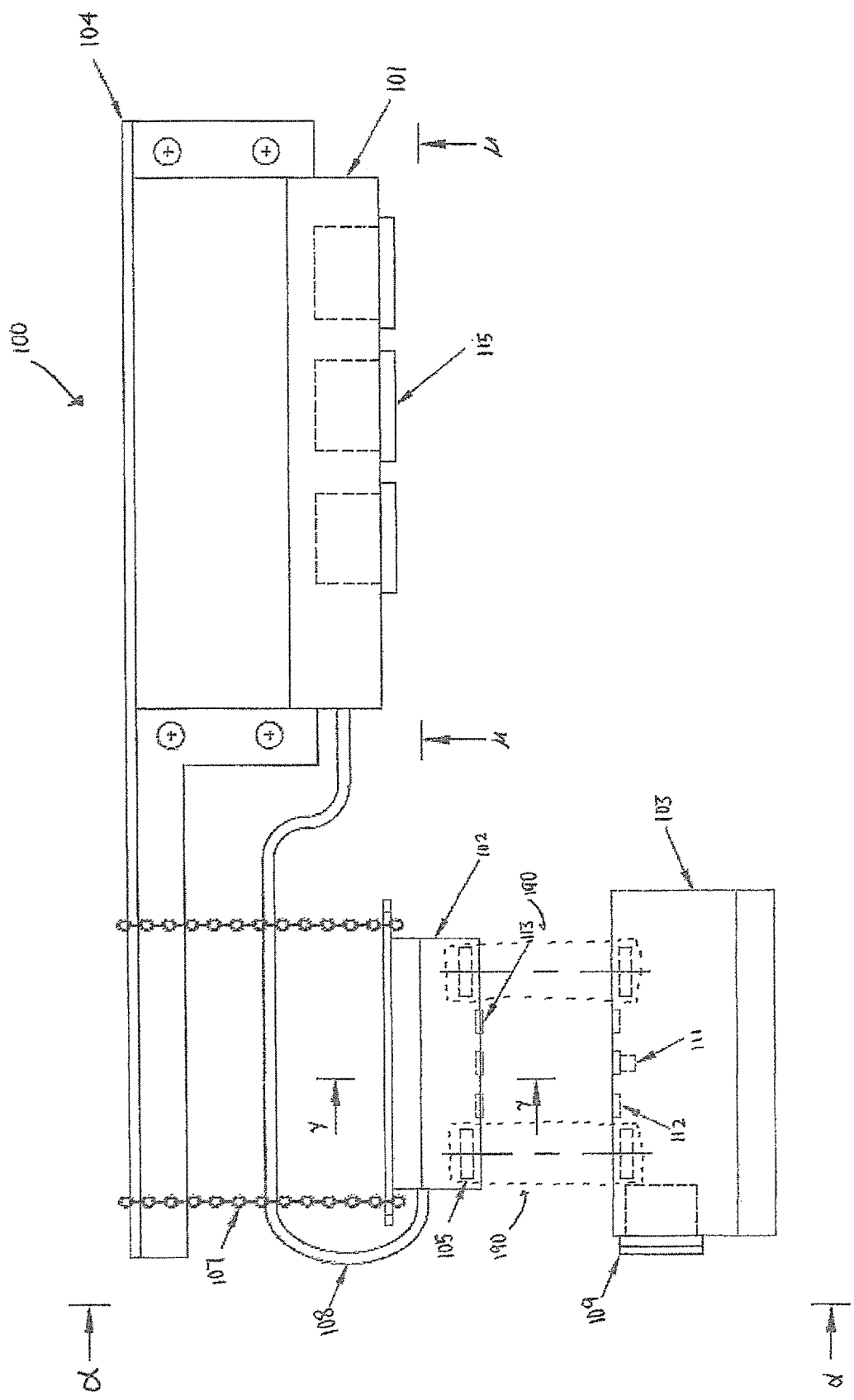
FIG. 1 is a front view of a power system according to an embodiment.

Throughout the specification, unless the context requires otherwise, the word "comprise" or variations such as "comprises" or "comprising, will be understood to imply the inclusion of a stated integer or group of integers but not the exclusion of any other integer or group of integers.

Furthermore, throughout the specification, unless the context requires otherwise, the word "include" or variations such as "includes" or "including" will be understood to imply the inclusion of a stated integer or group of integers but not the exclusion of any other integer or group of integers.

The present disclosure contemplates a power system to which one or more devices can be connected to. The power system is capable of distributing power to one or more connected devices. Preferably, the power system can include an adapter portion (e.g., a socket module) and an apparatus (e.g., a plug module). The adapter portion can be coupled to a power supply source (e.g., a direct current supply or an alternating current supply) and the apparatus can be coupled to the adapter portion.

The present disclosure further contemplates that the adapter portion and the apparatus can be aligned in a contactless manner. Upon proper alignment, contact between the adapter portion and the apparatus can be established in a manner so that power can flow between the adapter portion and the apparatus. Specifically, power supplied by the power supply source can be communicated from the adapter portion to the apparatus.

Preferably, the power system includes a guiding system (e.g., a magnetic guiding system) which can facilitate such contactless alignment between the adapter portion and the apparatus. Via the guiding system, a multiple axis based alignment compensation can be afforded to advantageously facilitate ease of alignment between the adapter portion and the apparatus.

For example, a 6-axis alignment compensation can be afforded. Specifically:
Roll, pitch and yaw compensation of ±15 degrees (deg)
Shift (X-Y directions) compensation of ±5 millimetres (mm)
Shift (Z direction) compensation of ±15 mm Additionally, the power system can further include one or more safety measures to ensure alignment between the adapter portion and the apparatus has been properly established prior to allowing flow of power supplied between the adapter portion and the apparatus.

Safety measure(s) can include, for example, pressure sensing and/or magnetic sensing.

Generally, in accordance with an aspect of the disclosure the power system can further include a power distributor capable of distributing power to the device(s) connected to the power system. The aforementioned apparatus can be coupled to the power distributor.

Preferably, when the adapter is brought within proximity of the apparatus, or vice versa (i.e., the apparatus is brought within proximity of the adapter), automatic alignment between the adapter and the apparatus can be achieved.

These will be discussed in further detail with reference to FIGS. 1 to 7 hereinafter.

Referring to FIG. 1, a power system 100 is shown according to an embodiment of the disclosure. As shown, the power system 100 can include a power distribution box 101, an apparatus (e.g., a plug) 102 and an adaptor portion (e.g., a socket) 103. The power system 100 may comprise more or less components as described and/or as depicted. Preferably, the apparatus 102 is moveable. Moreover, one or more devices (not shown) can be coupled to the power system 100 via the power distribution box 101.

Figure 2:
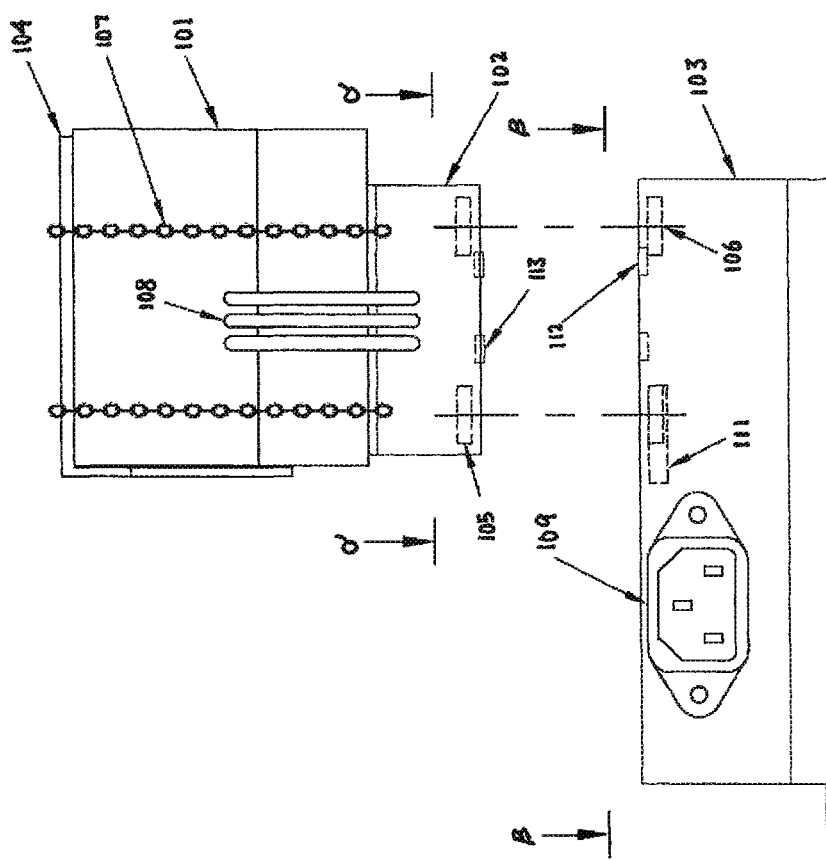
FIG. 2 is a cross-sectional view of FIG. 1 along the line α-α.

As can be seen from FIGS. 1 and 2, the power distribution box 101 and the apparatus 102 can be carried by a support structure 104 such as a bracket. The apparatus 102 can be coupled to the power distribution box 101. In an example, the power distribution box 101 and the apparatus 102 can be mounted onto a bracket. The support structure 104 (i.e., which carries the power distribution box 101 and the apparatus 102 can form a part of a moveable equipment or can be mounted onto the moveable equipment. The support structure 104 can, for example, be made from aluminium. In some embodiments, the support structure 104 can be made from other materials such as iron, stainless steel, etc.

In one embodiment, the apparatus 102 can be moveably carried by the support structure 104. Specifically, the apparatus 102 can be moveably coupled to the support structure 104. More specifically, the apparatus 102 can, for example, be pendulously coupled to the support structure 104. Yet more specifically, the apparatus 102 can, for example, be coupled to the support structure 104 in a manner such that pendulous movement of the apparatus 102 relative to the support structure 104 can be allowed. In one example, the apparatus 102 can be coupled to the support structure 104 by manner of one or more flexible couplers 107 (e.g., one or more chains).

The adapter portion 103 can, in one embodiment, be located at a designated location such as a fixed pillar, a warehouse shelf or any other locations suitable for mounting the adapter portion 103. The adapter portion 103 may be mounted or fixed on the designated location via fasteners such as screws, nails etc. In another embodiment, the adapter portion 103 can be handheld and its position/location shifted/adjusted in accordance with holder (i.e., user) preference. Moreover, the adapter portion 103 can be coupled to a power supply source (not shown).

In some embodiments, the body of the power distribution box 101 is made of any conventional non-conductive material (or electrical insulators) such as plastic, rubber, wood, or combinations or hybrids thereof. The power distribution box 101 may comprise one or more electrical circuits with electrical or electronic components, such as rectifiers, analogue to digital converters, electronic switches, short circuit/open circuit protection etc.

Operationally, the apparatus 102 and the adapter portion 103 can either be in contact or separated. When in contact, power supplied by the power supply source can be communicated from the adapter portion 103 to the apparatus 102, subsequently to the power distribution box 101 and further subsequently to the device(s) connected to the power distribution box 101. Conversely, when contact between the adaptor portion 103 and the apparatus 102 is broken (i.e., the apparatus 102 and the adaptor portion 103 have been separated), power supplied to the device(s) is disrupted (i.e., power supplied by the power supply source cannot be communicated from the adaptor portion 103 to the apparatus 102).

Generally, it is preferable that the apparatus 102 and the adaptor portion 103 are aligned in a contactless manner. Upon proper alignment, contact between the adapter portion and the apparatus can then be established in a manner so that power (i.e., supplied by the power supply source) can flow between the adapter portion 103 and the apparatus 102.

Preferably, the power system includes a guiding system 190 (e.g., a magnetic guiding system) which can facilitate such contactless alignment between the adapter portion 103 and the apparatus 102 when the apparatus 102 is positioned in proximity to the adapter portion 103 (and vice-versa). This will be discussed later in further detail with reference to FIGS. 3 to 7.

Figure 3:
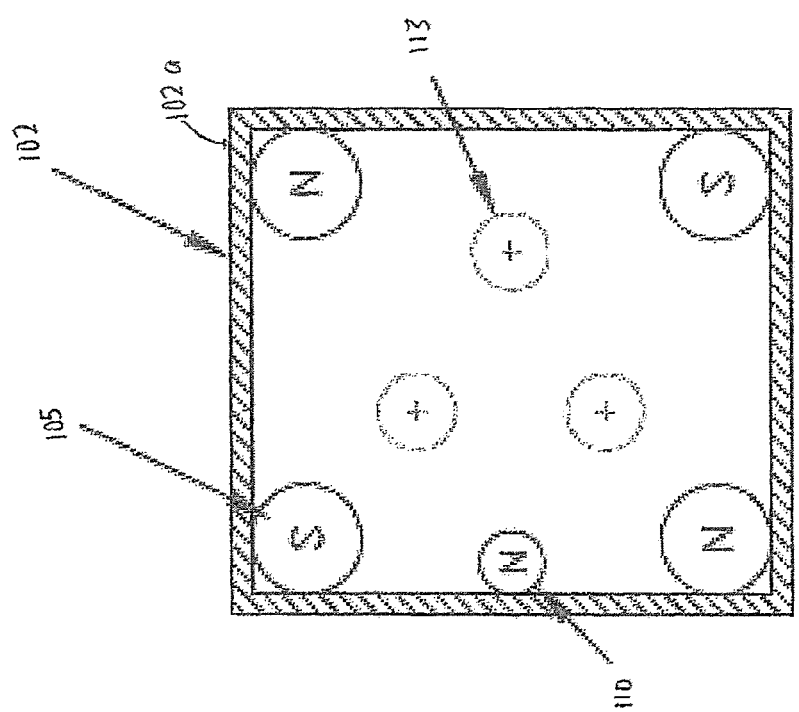
FIG. 3 is a cross-sectional view of FIG. 2 along the line δ-δ.

FIG. 3 shows the apparatus 102 in further detail, in accordance with an embodiment of the disclosure. As shown, the apparatus 102 can include a casing 102a. The casing 102a can be shaped and dimensioned to carry an alignment portion 105, a sensor portion 110 and a contact portion 113. The alignment portion 105 can, in one embodiment, include one or more magnetic elements. The sensor portion 110 can, in one embodiment, include one or more devices capable of generating sensor signal(s) (e.g., a magnet generating a magnetic field based sensor signal). The contact portion 113 can, for example, be in the form of one or more electrical contact pins and/or receptacles.

Figure 4:
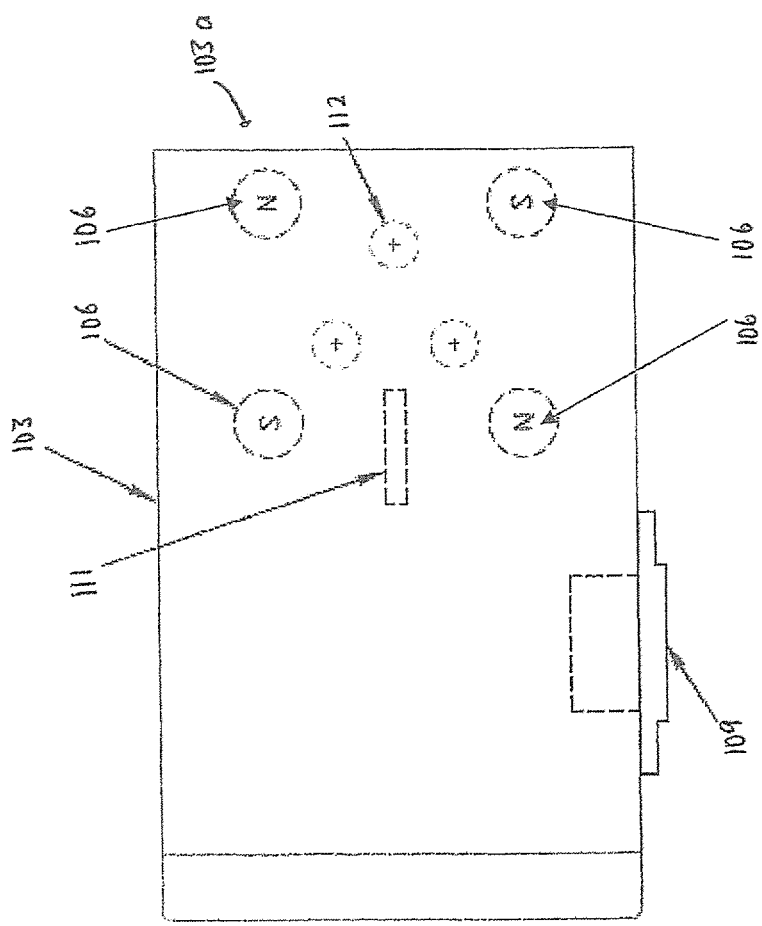
FIG. 4 is a cross-sectional view of FIG. 2 along the line β-β.

FIG. 4 shows the adapter portion 103 in further detail, in accordance with an embodiment of the disclosure. As shown, the adapter portion 103 can include a chassis 103a (i.e., analogous to the casing 102a). The chassis 103a can be shaped and dimensioned to carry an alignment module 106, a sensor module 111 and a contact module 112. The alignment module 106 can, in one embodiment, include one or more magnetic elements. The sensor module 111 can, in one embodiment, include one or more devices capable of detecting sensor signal(s) (e.g., a switch such as a reed switch capable of detecting the aforementioned magnetic field based sensor signal). The contact module 112 can, for example, be in the form of one or more electrical contact pins and/or receptacles. Moreover, the adapter portion 103 can include an inlet module 109 (e.g., in the form of an electrical receptacle) to which a power supply source can be coupled. The inlet module 109 can be coupled to the contact module 112 so that power supplied by the power supply source can be communicated to the contact module 112. Appreciably, the adaptor portion 103 includes an electrical pathway (e.g., electrical wire(s)) coupling the inlet portion 109 and the contact module 112. The sensor module 111 can be disposed along the electrical pathway between the inlet module 109 and the contact module 112. Preferably the sensor module 111, as will be discussed later in further detail, can be configured to either allow or impede flow of power through the electrical pathway between the inlet module 109 and the contact module 112.

The invention will now be described with reference to an exemplary scenario where the guiding system 190 correspond to a magnetic guiding system and magnetic elements are used to facilitate automatic alignment between the apparatus 102 and the adapter portion 103. It is appreciable that other means of facilitating automatic alignment such as by manner of sensors, mechanical and/or electronic means can also be possible/useful. Appreciably, the guiding system 190 can be based on the combination of the alignment portion 105 and the alignment module 106. The alignment portion 105 can include one or more magnetic elements and the alignment module 106 can include corresponding one or more magnetic elements. Specifically, for every magnetic element associated with the alignment portion 105, the alignment module 106 includes a counterpart magnetic element. When brought in proximity, an attractive force can established between a magnetic element of the alignment portion 105 and a counterpart magnetic element of the alignment module 106.

For example, the alignment portion 105 can include a first magnetic element and a second magnetic element positioned/carried at, respectively, a first side and a second side of the casing 102a (i.e., where the first side opposes the second side). In this regard, the alignment module 106 can correspondingly include a first counterpart magnetic element and a second counterpart magnetic element positioned/carried at, respectively, a first side and a second side of the chassis 103a (i.e., where the first side opposes the second side). The first magnetic element and first counterpart magnetic element are positioned such that an attractive force can be established when they are in proximity. Analogously, the second magnetic element and second counterpart magnetic element are positioned such that an attractive force can be established when they are in proximity. In one embodiment, when the first magnetic element and the second counterpart magnetic element are proximity, a repulsive force can be generated. Analogously, when the second magnetic element and the first counterpart magnetic element are proximity, a repulsive force can be generated.

Specifically, in the aforementioned exemplary scenario, the adapter portion 103 can be a fixed position at a designated location whereas the support structure 104 carrying the apparatus 102 can be moved.

When the support structure 104 has been moved such that the apparatus 102 is in proximity to the adapter portion 103 to such a degree that an attractive force can be established at least between the first magnetic element and the first counterpart magnetic element, the apparatus 102 and the adapter portion 103 can be brought into contact with each other. Appreciably, if the first magnetic element and the second counterpart magnetic element are in proximity, a repulsive force can be generated, thus impeding contact between the apparatus 102 and the adaptor portion 103.

Appreciably, by manner of attractive and/or repulsive force as discussed above, contactless and/or automatic alignment between the apparatus 102 and the adapter portion 103 can be facilitated by the guiding system 190.

In this regard, when the apparatus 102 and the adaptor portion 103 are engaged (i.e., when the apparatus 102 is brought into contact with the adaptor portion 103) such that the contact portion 113 and the contact module 112 are electrically connected and an electrical path can be properly established between the apparatus 102 and the adaptor portion 103, flow of power from the power supply to the apparatus 102 via the adaptor portion 103 can be allowed.

As mentioned earlier, the apparatus 102 can be coupled to the power distribution box 101 which can, in turn, be coupled to one or more devices (e.g., external equipment). Hence electrical power can be provided for various purposes including lighting such as LED lighting (i.e., a lightning device which is connected to the power distribution box 101). As discussed earlier, this can be achieved when the apparatus 102 and the adapter 103 are brought into proximity with each other and when an attractive force (signifying proper alignment), as opposed to repulsive force (signifying improper alignment) is generated, to bring the apparatus 102 and the adapter portion 103 into contact with each other. Consequently, the contact portion 113 and the contact module 112 can come into contact, and an electrical pathway can be formed there through and allowing flow of electricity to the power distribution box 101 and subsequently device(s) connected to the power system 100 via the power distribution box 101.

The present disclosure contemplates that although an electrical pathway can be established by manner of auto-alignment/contactless alignment as discussed above, it would be advantageous for the power system 100 to have in place one or more safety mechanisms to mitigate safety hazards.

An example of a safety mechanism can be based on the combination of the sensor portion 110 and the sensor module 111. The sensor portion 110 can, for example, correspond to a magnet (i.e., an alignment sensing magnet) and the sensor module 111 can, for example, correspond to a reed switch. The reed switch can be disposed along the electrical pathway between the inlet module 109 and the contact module 112. The reed switch can be in one of a closed circuit configuration and an open circuit configuration. Specifically, the reed switch can be configured to switch between an open circuit configuration and a closed circuit configuration. The closed circuit configuration can, for example, be the default configuration. Therefore, it is appreciable that in default configuration, the reed switch effectively causes the electrical pathway between the inlet module 109 and the contact module 112 to be in open circuit condition. Further appreciably, in open circuit condition, flow of power through the electrical pathway between the inlet module 109 and the contact module 112 would be impeded. Therefore, in an embodiment, the sensor portion 110 can be carried (i.e., positioned/arranged) by the casing 102a and the sensor module 111 can be carried (i.e., positioned/arranged) by the chassis 103a such that in proper alignment (i.e., when the apparatus 102 and the adaptor portion 103 come into contact), the sensor portion 110 can be brought to proximity to the sensor module 111. When in proximity, sensor signal(s) (e.g., magnetic field based sensor signal(s)) generated by the sensor portion 110 can be detected by the sensor module 111 and based on such detection, the sensor module 111 can be configured to allow flow of power through the electrical pathway between the inlet module 109 and the contact module 112. Specifically, when the reed switch detects magnetic field based sensor signals generated by the alignment sensing magnet (i.e., by virtue of the alignment sensing magnet and the reed switch being in proximity), the reed switch can be switched from open circuit configuration (i.e., default configuration) to closed circuit configuration, hence allowing flow of power through the electrical pathway. In this regard, by virtue of the reed switch sensing magnetic field based sensor signals generated by the alignment sensing magnet and switching from open circuit configuration to closed circuit configuration, proper alignment between the apparatus 102 and the adaptor portion 103 can be determined/ascertained.

Another example of a safety mechanism can be by manner of configuring the contact pin(s) of the contact portion 113 and/or contact module 112 to be spring-loaded. When the apparatus 102 and the adapter portion 103 are properly aligned, it is appreciable that the contact pin(s) would be substantially evenly contacted (e.g., pressed down). Therefore, it is possible to determine whether there is proper alignment by determining whether pressure has been evenly applied on each spring-loaded contact pin. In this regard, proper alignment can be determined by manner of pressure sensing (i.e., of the spring-loaded contact pin(s)).

It is appreciable that safety mechanism can be by manner of a combination of:
1) the combination of the sensor portion 110 and the sensor module 111
2) pressure sensing Therefore, it is appreciable that the power system 100 can include an apparatus 102 which is suitable for conveying power and which is suitable for use with an adapter portion 103. The adaptor portion can be connected to a power supply source and can include a contact module 112 through which power from the power supply source can be communicated.

Generally, the apparatus can include a casing shaped and dimensioned to carry:

- an alignment portion 105 configurable to facilitate contactless alignment between the apparatus 102 and the adapter portion 103.
- a contact portion 113 which is capable of being coupled to the contact module 112 when alignment between the apparatus 102 and the adapter portion 103 is established.
- a sensor portion 110 configurable to one of impede and allow flow of power between the contact portion 113 and the contact module 112.

Specifically, the sensor portion 110 can be configured to either impede or allow flow of power between the contact portion 113 and the contact module 112 by manner of generating sensor signals which can be detected by the sensor module 111. Depending on whether sensor signals generated by the sensor portion 110 has been detected by the sensor module 111, flow of power between the inlet portion 109 and the contact module 112 can be disrupted. In this regard, the sensor portion 110 can effectively be considered to be configurable to one of impede and allow flow of power between the contact portion 113 and the contact module 112.

More specifically, the sensor portion 110 can be configured to impede flow of power upon determination that alignment between the apparatus 102 and the adapter portion 103 is improperly established. Conversely, upon determination that alignment between the apparatus 102 and the adaptor portion 103 has been properly established, the sensor portion 100 can be configured to allow flow of power.

The aforementioned magnetic element(s) and counterpart magnetic element(s) will be discussed in further detail with reference to magnetic polarity hereinafter.

In the embodiments as illustrated in FIGS. 1-7, it is appreciable that in a correct operative position (i.e., proper alignment between the apparatus 102 and the adaptor portion 103), the magnetic element(s) 105 and the counterpart magnetic element(s) 106 are arranged so as to form and attractive force towards each other to bring the apparatus 102 and the adaptor portion 103 together. This is typically the case when a 'north' polarity of a magnetic element 105 attracts a 'south' polarity of a counterpart magnetic element 106. In incorrect positions, the 'north' polarity of a magnetic element 105 may be brought in the vicinity of the 'north' polarity of a counterpart magnetic element 106 such that a repulsive force is generated. In some embodiments where the magnetic element(s) and counterpart magnetic element(s) 105, 106 are in the incorrect positions, the magnetic element(s) and counterpart magnetic element(s) 105, 106 may be repelled away from each other but may attract each other when through the action of being repelled, the magnetic element(s) and counterpart magnetic element(s) displaced and automatically brought to be aligned correctly and thereafter attract each other.

Specifically, FIG. 4 illustrates, in one embodiment, four counterpart magnet elements 106 carried by the chassis 103a; and FIG. 3 shows, in one embodiment, four magnetic elements 105 carried by the case 102a. Each magnetic element and counterpart magnetic element has a side representing a polarity (i.e. either a north polarity or a south polarity) that is outward-facing. These magnets guide the apparatus 102 and adapter portion 103 to be aligned with each other and subsequently brought into contact. As can be seen in both FIGS. 3 and 4, the magnets are arranged in such a way that the north (N) facing side of one magnet at one corner of the apparatus 102/adaptor portion 103 is facing out, and the south (S) facing side of another magnet in the corner next to it is facing out. The outward-facing sides of the magnetic elements 105 of the apparatus 102 attracts the outward-facing sides of the counterpart magnetic elements 106 of the adaptor portion 103. This alternate arrangement of the magnets minimizes incorrect coupling. It should be appreciated that more or less magnetic elements/counterpart magnetic elements could be used.

In various embodiments, there comprises an alignment compensation of the six axes on the coupling of the apparatus 102 and the adaptor portion 103 as follows:

Pitch and yaw compensation of ±15 degrees
Shift (X-Z axis) compensation of ±15 mm
Shift (Y axis) compensation of −15 mm
Roll compensation of ±15 degrees Pitch is the rotation around the Y axis, yaw is the rotation around the Z axis and roll is the rotation around the X axis. Appreciably, the apparatus 102 is pendulously carried by the support structure 104 (e.g., by manner of chain(s) 107 coupling the apparatus 102 to the support structure 104). Thus by manner of pendulous coupling of the apparatus 102 to the support structure 104, the aforementioned alignment compensation can be facilitated. For effective coupling and alignment, at least 3 axes of the coupling should be compensated.

In an embodiment, four chains 107 are used wherein each chain is located at each of the four corners of the apparatus 102. Each chain 107 can connect a corner of the apparatus 102 to the support structure 104. From FIG. 1, two chains 107 are depicted. A chain 107 is preferably made of metal.

The apparatus 102 can be electrically connected to the power distribution box 101 via, for example, conductor wires 108. The conductor wires 108 may be flexible. This allows free movement of the apparatus 102 in different axial directions. The 6-axis alignment compensation during coupling of the apparatus 102 and the adaptor portion 103 as mentioned above can be achieved through this free movement of the apparatus 102 during the process of the guiding system 190 guiding alignment between the apparatus 102 and the adaptor portion 103.

Figure 7:
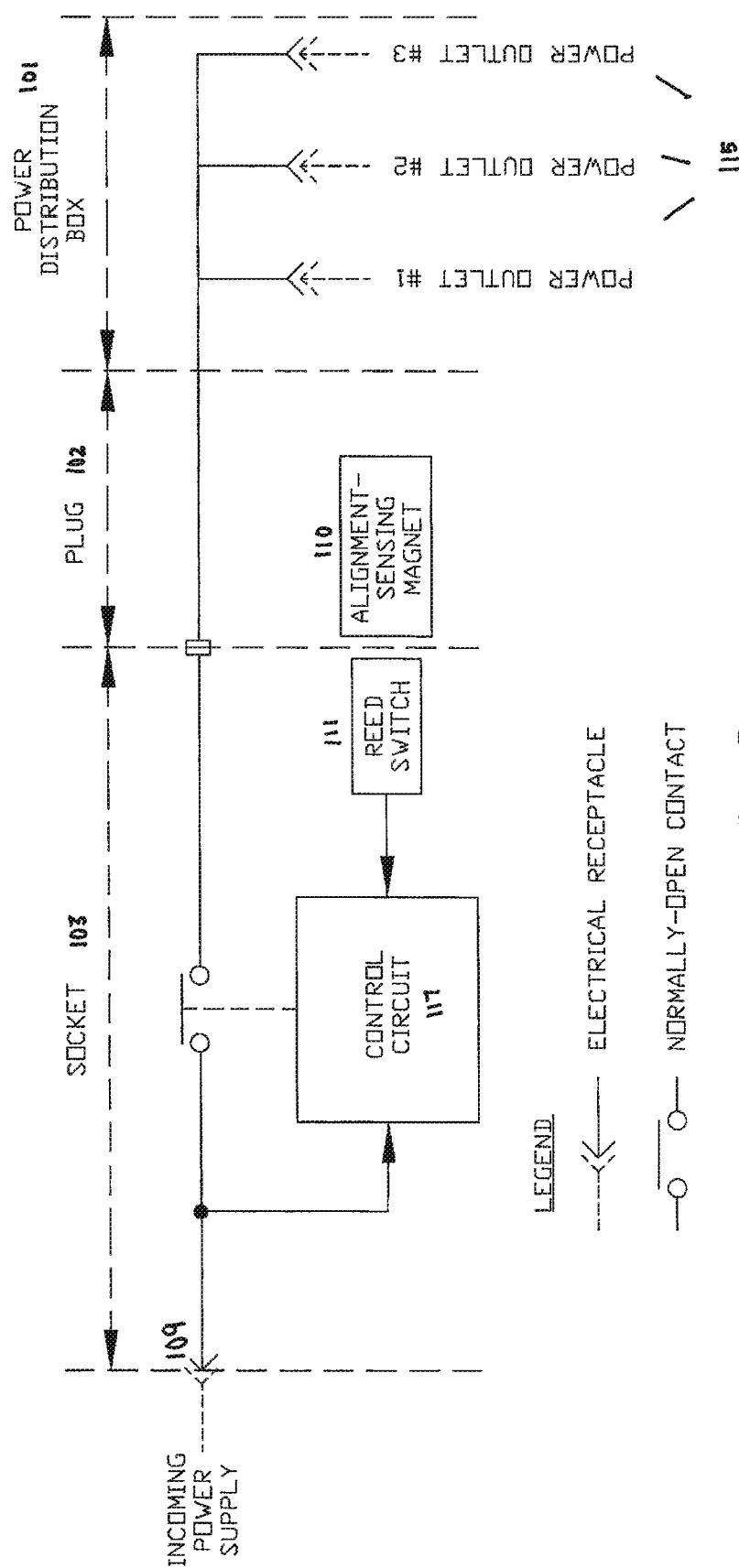
FIG. 7 is an electrical schematic diagram of the power system, according to an embodiment.

FIG. 7 is an electrical schematic diagram of the power system 100, according to an embodiment of the disclosure. It can be seen from FIG. 7 that in operation, the adaptor portion 103 can include a control circuit 117 connected to the reed switch and its normally-open contacts. The electrical receptacle 109 on the adaptor portion 103 acts as a power inlet. Once the apparatus 102 and the adaptor portion 103 are coupled correctly together, the alignment-sensing magnet 110 carried by the casing 102*a* of the apparatus 102 will close the contact of the reed switch 111, or any electrical switch operated by an applied magnetic field, carried by the chassis 103*a* of the adaptor portion 103. This will activate the control circuit 117. The reed switch acts as feedback loop providing a safety aspect of the invention. The reed switch is activated only when the alignment sensing magnet 110 is detected.

Once the apparatus 102 and adaptor portion 103 have been properly coupled, there is typically a delay of for example 3 seconds, before power flows between one or more electrical contacts 112 of the adaptor portion 103 and one or more electrical contacts 113 of the apparatus 102.

Clearly, the invention includes embodiments with more or less electrical contacts than illustrated. The electrical contacts 112 and 113 are preferably made of copper or copper plated with silver. Once the alignment-sensing magnet 110 is pulled away from the reed switch 111, the reed switch 111 will go back to its original position having normally-open contacts.

Figure 5:
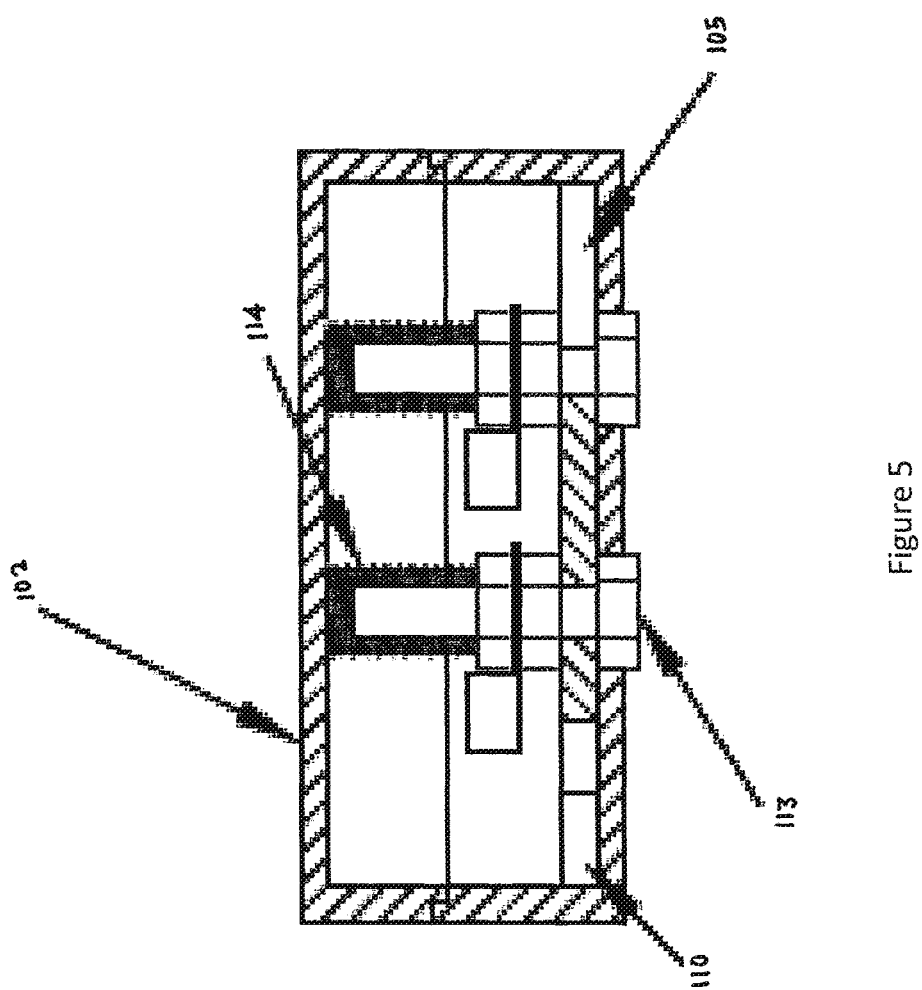
FIG. 5 is a cross-sectional view of FIG. 1 along the line γ-γ.

As illustrated in FIG. 5, each of the one or more electrical contacts (e.g., electrical pins) 113 of the plug 102 is loaded with one or more biasing mechanisms such as spring 114 so that approximately equal pressure could be applied on each of the contacts 113 after the apparatus 102 is coupled to the adaptor portion 103.

Figure 6:
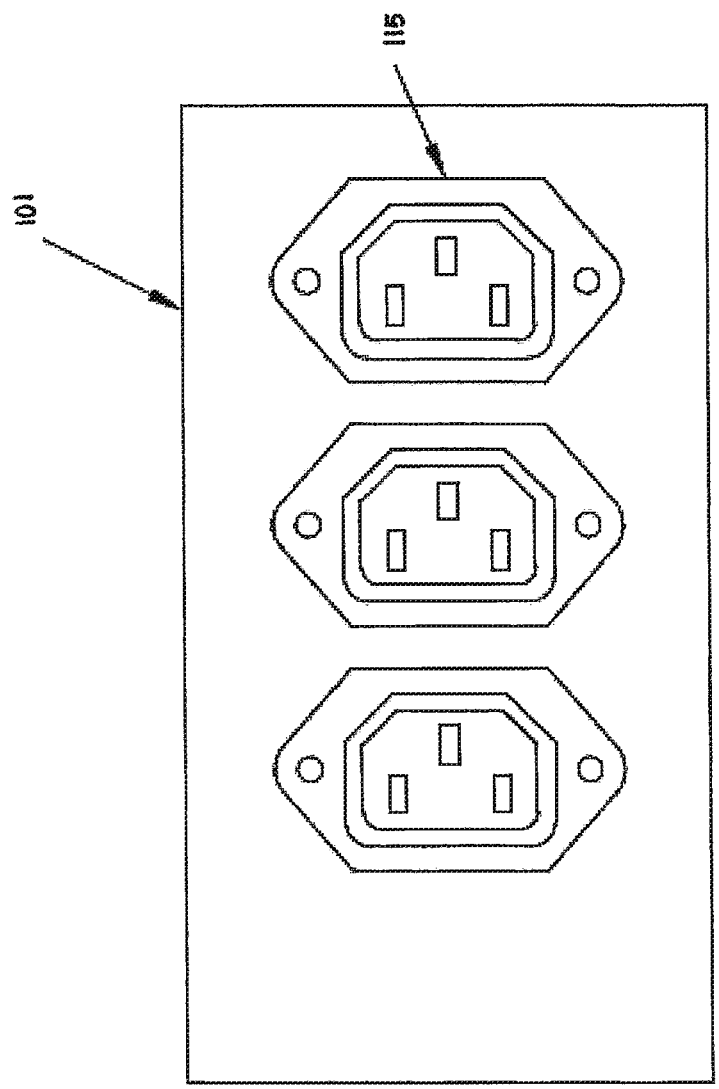
FIG. 6 is a cross-sectional view of FIG. 1 along the line μ-μ.

The power distribution box 101 can distribute power, for example, among more than one LED lighting on the moveable equipment. This is done through a plurality of electrical receptacles 115 each serving as a power outlet as can be seen in FIG. 6.

The power system 100 will now be described in the context of an application of a vegetables farming system. References to vegetables in this document shall include all species of plants or parts of plants, whether produced for food consumption or not. The invention can be applied to various forms of agriculture and/or horticulture activity for the reproduction of all leafy and stem vegetables including fruits. Although the invention is described with reference to a farming system, it is to be appreciated that the invention is applicable to a wide range of other fields and technologies such as providing connection at data centres that host cryptocurrency mining servers such as for network cable connection for the distribution of signal data.

Figure 8:
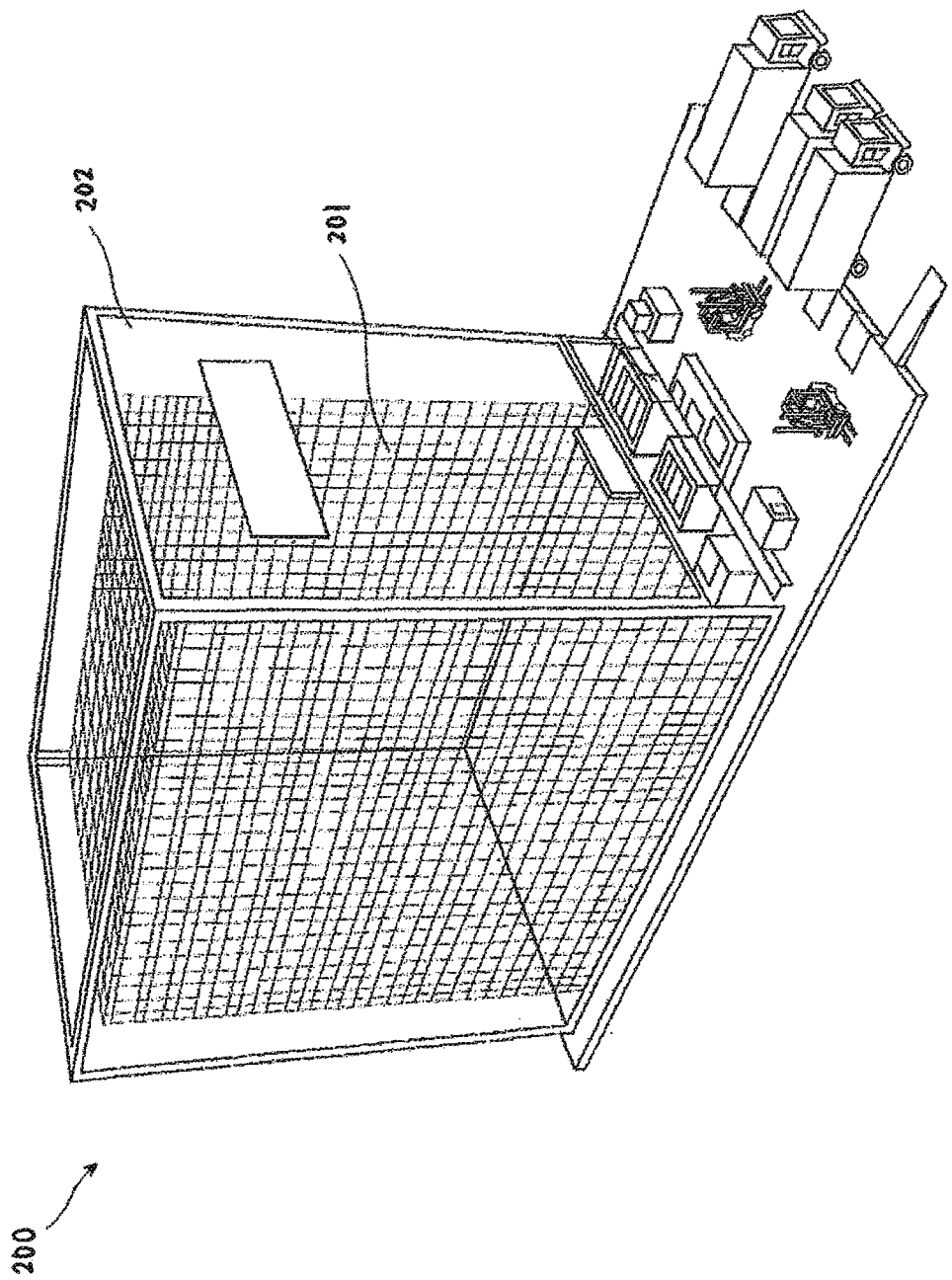
FIG. 8 is a perspective view of a farming system in relation to the power system of FIG. 1, according to an embodiment.

FIG. 8 shows a farming system 200 for growing various types of plants. The farming system comprises one or more growth shelves/racks 201 typically utilized in logistics management and is capable of being extended to a height where different types of plants, such as vegetables or fruits, may be grown in the at least one growth shelf and/or rack in a building 202 or any indoor environment. For example, the farm 200 may be configured to grow a large variety of vegetables or plants, including but not limited to Pakchoy, Naibai, Chyesim, Romaine Lettuce, Butterhead Lettuce, Swiss Chard, Kale, Arugula, Basil, Cherry Tomatoes, Strawberry, rice and Japanese Cucumbers. Further, the plants may be harvested in an automated manner. The growth racks 201 are suitable for holding growth modules/trays 203 that allow plants to grow within. It is also useful for storage and holding purposes wherein one or more types of plant or vegetables can grow.

In a preferred embodiment, the farming system includes the following elements:

an automated system comprising hardware and control software of farming beds, loading and unloading of one or more farming modules, water/nutrient supply and lighting;

an environmental control system for controlling parameters such as temperature, moisture, $CO_2$ level control, and air ventilation; and a farm operation management system that integrates the foregoing systems and provides effective operation of the farming process within a farm 200.

The building 202 houses at least one growth rack 201, but typically a plurality of growth racks or shelves which may be used for holding growth modules 203 that are used for growing plants such as vegetables and/or fruit. In various embodiments, each growth rack 201 is elongated in the longitudinal direction of the building and capable of storing a plurality of growth modules 203 along the vertical and longitudinal directions.

In various embodiments, a plurality of growth racks 201 may be arranged laterally to define a 3-dimensional (3D) array of growth modules 203 along the lateral, vertical and longitudinal directions. Each growth modules 203 within the 3D array may receive and store a farming module 204. Hence it is appreciable that the building can correspond to a growth area which includes one or more growth racks 201.

Figure 9:
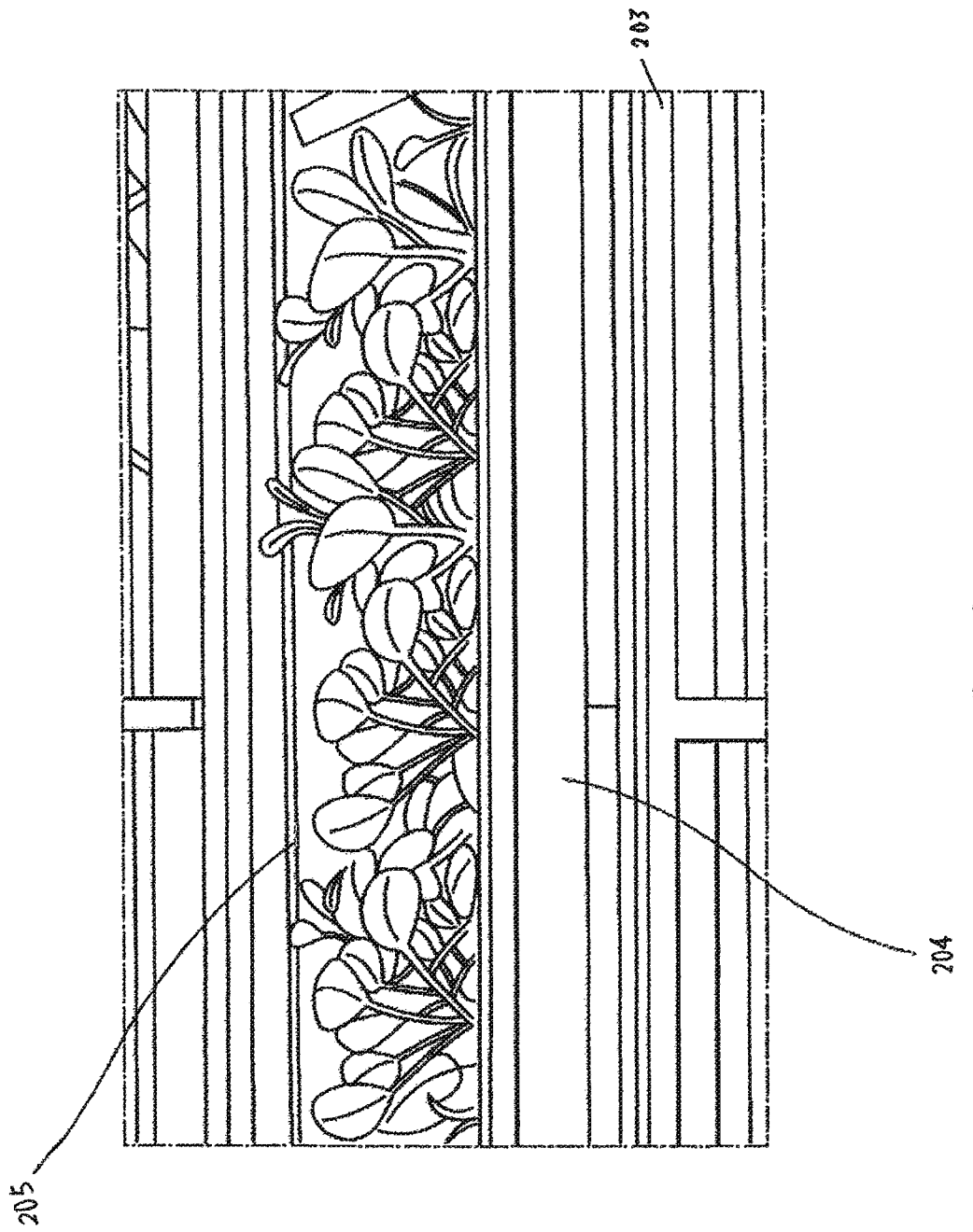
FIGS. 9 and 10 are various views of a modular unit comprising of growth trays and a plurality of LEDs above each growth tray.
Figure 10:
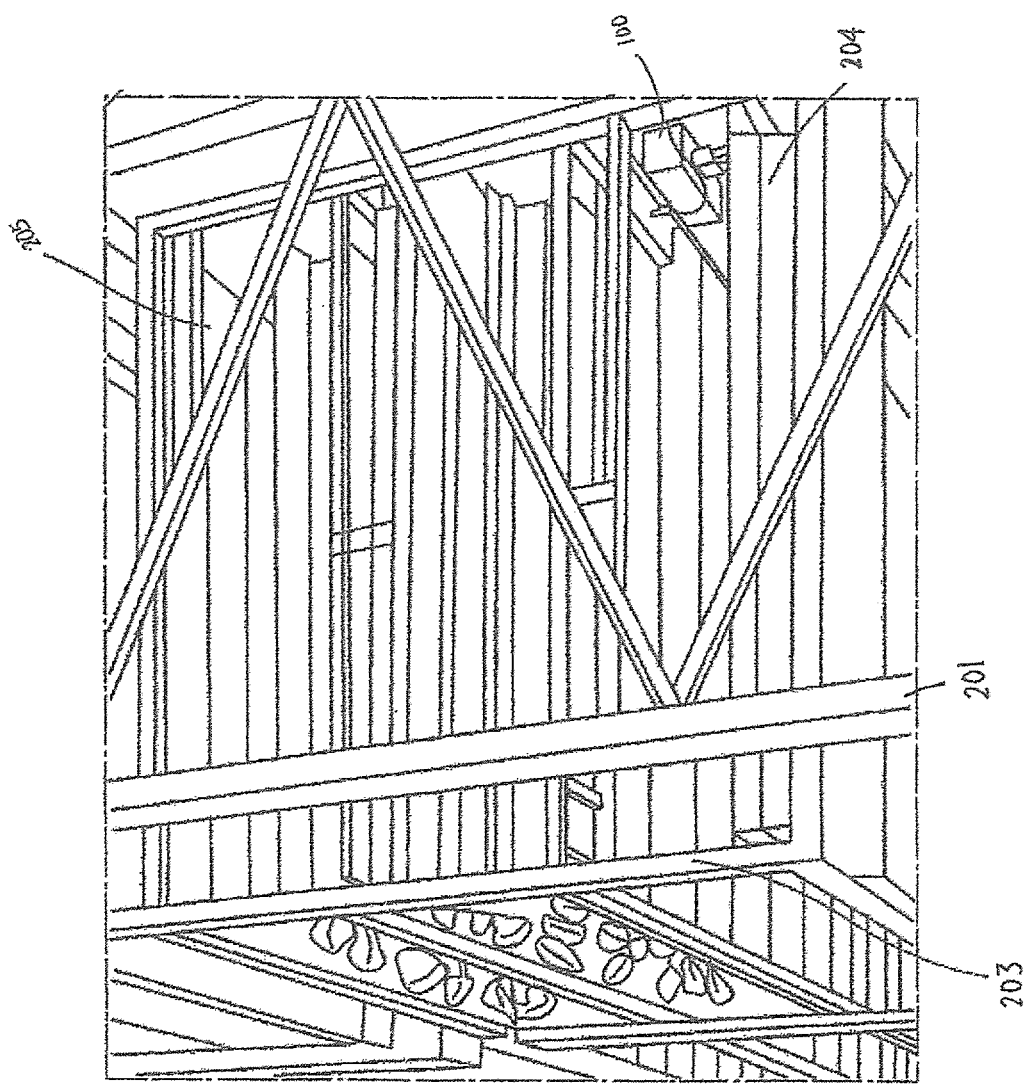

In various embodiments as illustrated in FIGS. 9 and 10, one or more LED lightings 205 may be installed above each farming tray to provide artificial light for photosynthesis necessary for growth of plants. The LED lighting 205 may be pre-installed on suitable locations or positions on the growth module 203 of the growth rack/shelf 201, such as horizontal beams or bars. LEDs are energy efficient as compared to other types of light sources such as fluorescent or incandescent light bulbs. Furthermore, the narrow band emission of LEDs allow the spectrum of the artificial sunlight to be tuned more precisely for optimal growth of different vegetable or plant varieties. Additionally, artificial sunlight may be provided to the vegetables in a consistent manner (by pre-defining cycles of illumination) as compared to traditional sunlight which tend to varies. Advantageously, the growth rate of the plant or vegetable is increased, allowing quicker harvesting.

To power the LED lightings 205 when a growth module 203 is loaded into the growth racks 201, a PC 100 as described above is used.

In a preferred embodiment, each growth module 203 has a plug 102 that is electrically connected to the arrays of LED lightings 205. Correspondingly, the growth racks 201 are installed with a socket 103 for coupling with the plug 102 when the growth modules 203 are loaded or mounted onto the growth racks 201 for electrical power to flow in order to activate the LED lightings and/or other electrical equipment located on the growth module 203. The PC 100 functions such that when a growth module 203 is inserted into the growth racks 201, the LED lightings 205 are switched on upon insertion. Removing or unmounting the growth modules 203 from the growth racks 201 un-couples the plug 102 from the socket 103 and the LED lightings 205 are hence switched off upon unmounting.

It should be appreciated by the person skilled in the art that variations and combinations of features described above, not being alternatives or substitutes, may be combined to form yet further embodiments falling within the intended scope of the invention.

For example, in some embodiments, the socket may be moveable and the plug fixed at a designated location. In other words, the positions of the socket and plug may be swapped, with any male and female connectors interchanged as known to as skilled person to create the connection for the flow of electrical energy.

The invention claimed is:

1. A power system comprising an apparatus suitable for conveying power and an adapter portion which is connectable to a power supply source and which comprises a contact module through which power from the power supply source is communicable, the apparatus capable of being pendulously coupled to a support structure and pendulously movable relative to the adapter portion, the apparatus comprising:
 a casing having four corners, and shaped and dimensioned to carry:
 a magnetic alignment portion configurable to facilitate contactless alignment between the apparatus and the adapter portion by manner of a 6-axis alignment compensation such that the apparatus is freely movable relative to the adaptor portion due to the 6-axis alignment compensation;
 a contact portion which is capable of being coupled to the contact module when alignment between the apparatus and the adapter portion is established, and
 a sensor portion configurable to allow flow of power between the contact portion and the contact module,
 wherein the casing is capable of being pendulously coupled at each of the four corners, to the support structure.

2. The power system of claim 1, wherein the 6-axis alignment compensation includes a pitch compensation of +/−15 degrees.

3. The power system of claim 1, wherein the 6-axis alignment compensation includes a yaw compensation of +/−15 degrees.

4. The power system of claim 1, wherein the 6-axis alignment compensation includes a roll compensation of +/−15 degrees.

5. The power system of claim 1, wherein the 6-axis alignment compensation has a Shift (X axis) compensation of +/−15 mm.

6. The power system of claim 1, wherein the 6-axis alignment compensation has a Shift (Z axis) compensation of +/−15 mm.

7. The power system of claim 1, wherein the 6-axis alignment compensation has a Shift (Y axis) compensation of +/−15 mm.

8. A farming system comprising the power system according to claim 1, the farming system comprising:
 one or more racks for supporting one or more growth modules; and
 one or more LED arrays positioned above the one or more growth modules;
 wherein the apparatus is attached on the one or more growth modules and the adaptor portion is attached to the one or more racks; and wherein when each of the one or more growth modules is mounted on the one or more racks, the apparatus is activated and provides electricity for the one or more LED arrays.

9. The power system as in claim 1,
 wherein the magnetic alignment portion comprises one or more magnetic elements adapted to be attracted to and aligned with a counterpart magnetic element on the adapter portion when in use.

10. The power system according to claim 9,
 wherein the contact portion comprises a plurality of spring-loaded contact pins, and
 wherein proper alignment of the contact pins is achieved when pressure has been evenly applied to each of the contact pins.

11. The power system of claim 1, wherein the sensor portion of the apparatus generates a sensor signal, and the adaptor portion comprises a sensor module for detecting the sensor signal.

12. The power system of claim 11, wherein the sensor portion is a magnet,
 and the sensor module is a reed switch.

13. The power system of claim 10, wherein the contact module comprises a plurality of spring-loaded contact pins, and wherein proper alignment of the contact pins is achieved when pressure has been evenly applied to each of the contact pins.

* * * * *